United States Patent
Leising et al.

[15] 3,650,162
[45] Mar. 21, 1972

[54] HYDRODYNAMIC TRANSMISSION

[72] Inventors: Maurice B. Leising, Clawson; Howard L. Benford, Troy, both of Mich.

[73] Assignee: Chrysler Corporation, Highland Park, Mich.

[22] Filed: Dec. 22, 1969

[21] Appl. No.: 887,019

[52] U.S. Cl. ..................................74/867, 91/167, 92/52, 188/347, 74/763, 74/868
[51] Int. Cl. ...................B60k 21/00, F16d 51/06, F01b 7/20
[58] Field of Search ...................................74/865, 867–869; 91/167; 92/52; 188/347

[56] References Cited

UNITED STATES PATENTS

| | | | |
|---|---|---|---|
| 2,932,977 | 4/1960 | Ball | 74/868 |
| 3,000,230 | 9/1961 | Froslie | 74/869 |
| 3,400,613 | 9/1968 | Johnson et al. | 74/869 |
| 3,424,037 | 1/1969 | Searles | 74/869 |
| 2,831,464 | 4/1958 | Lilliquist | 91/167 |

*Primary Examiner*—Arthur T. McKeon
*Attorney*—Harness, Talburtt and Baldwin

[57] ABSTRACT

Automatic power transmission having gearing adapted to be connected in different modes to produce different driving ratios. A hydraulic control circuit is provided with a kickdown servo unit having two pistons. The circuit also includes a control valve for 1-2 shifting of the transmission.

7 Claims, 13 Drawing Figures

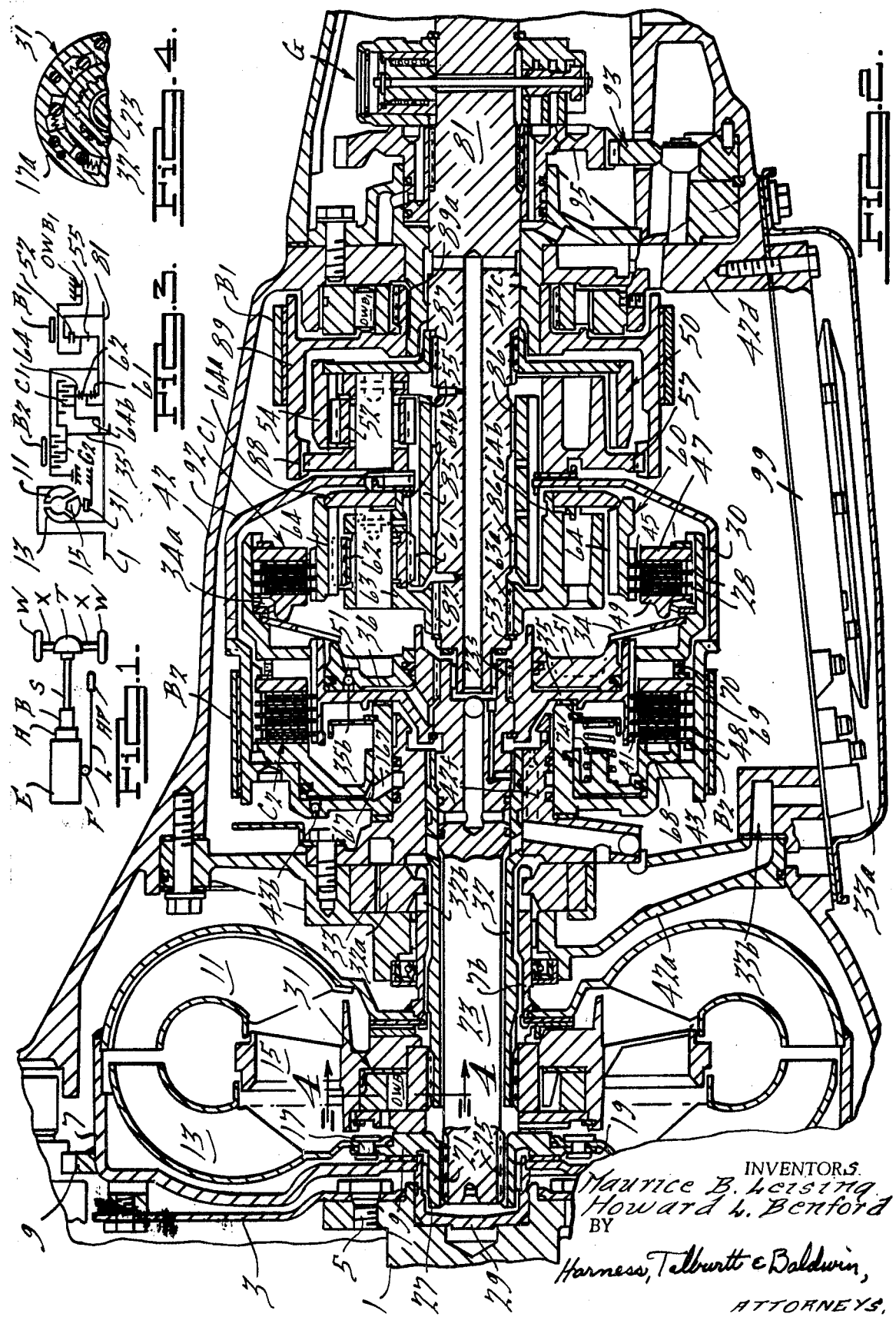

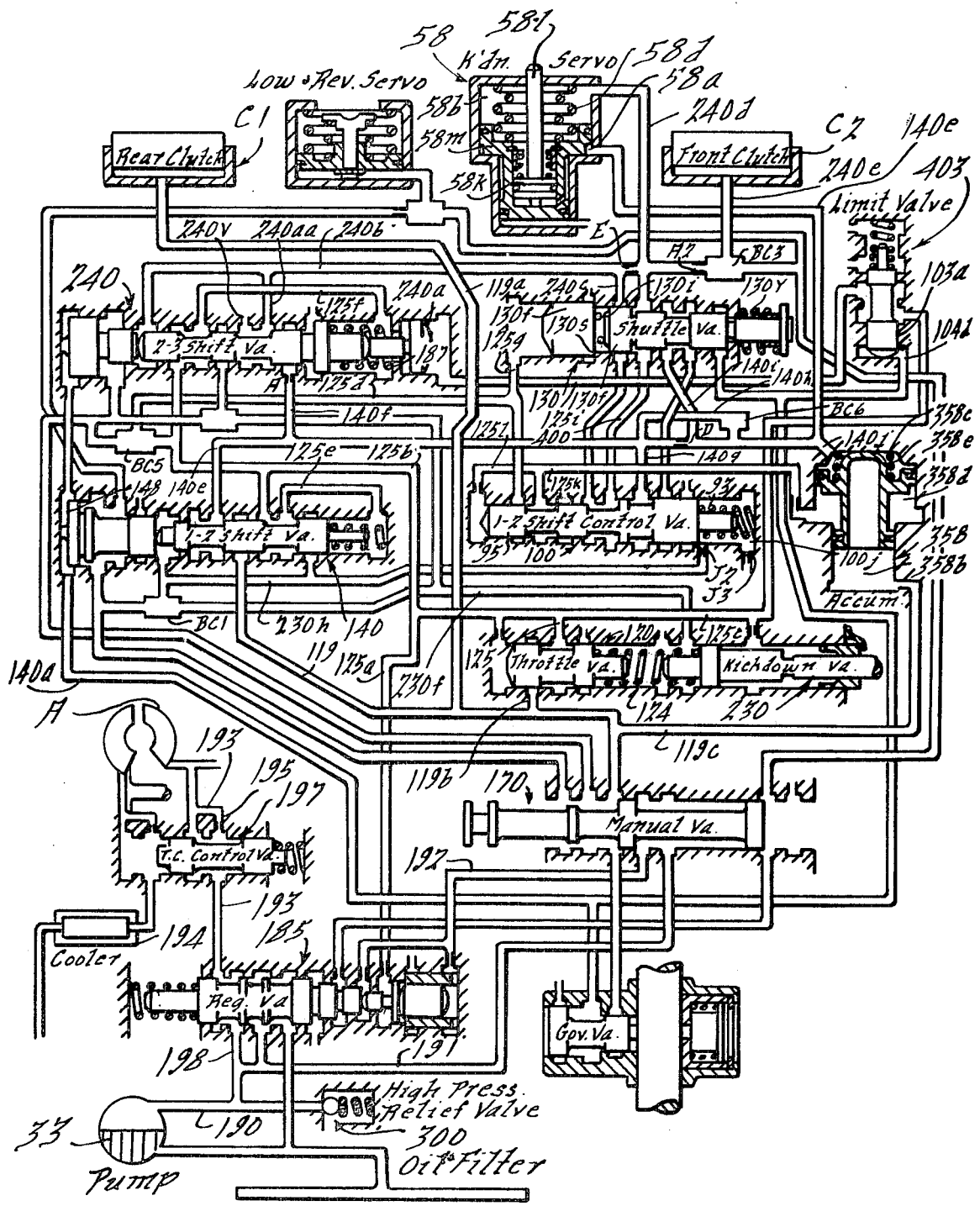

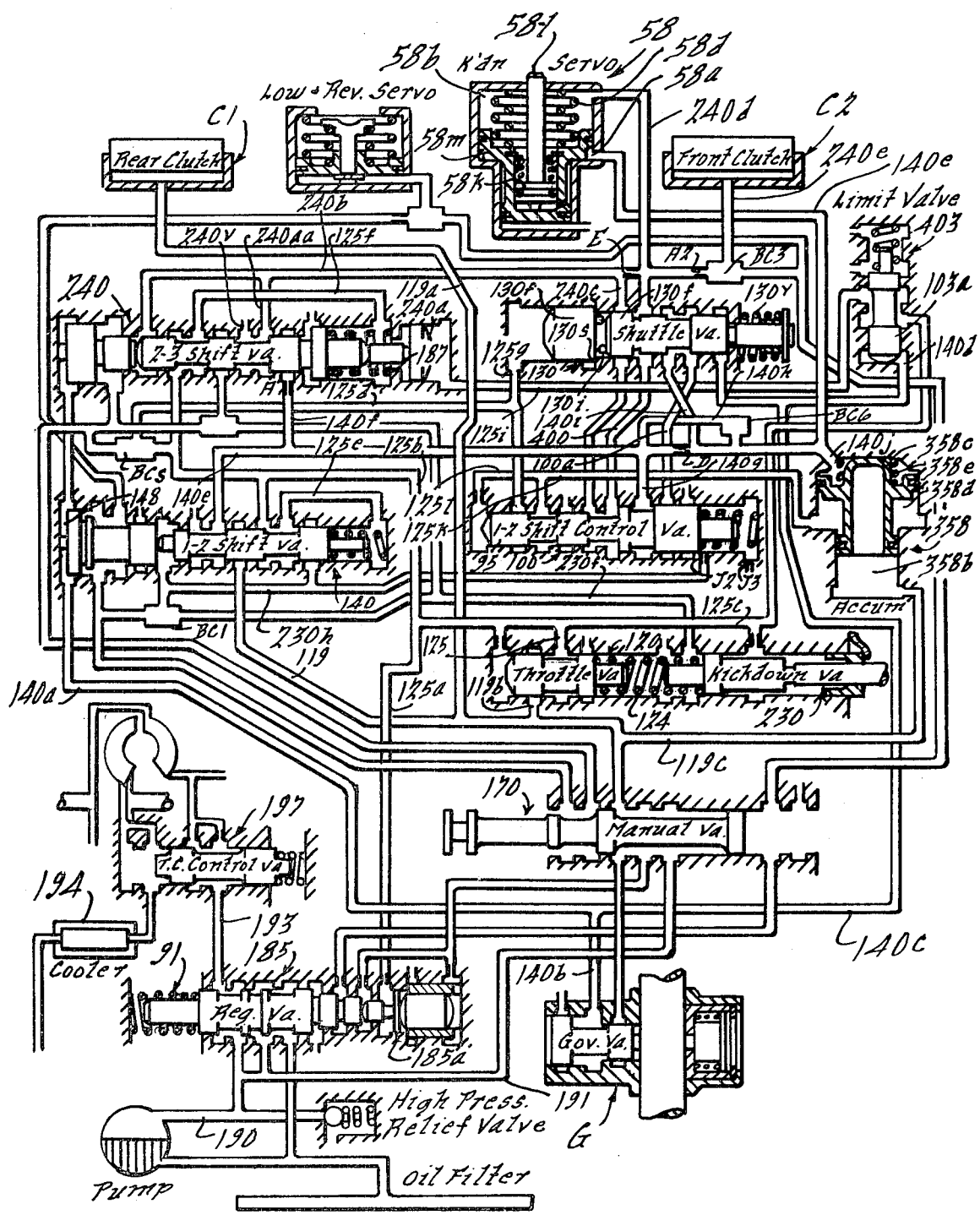

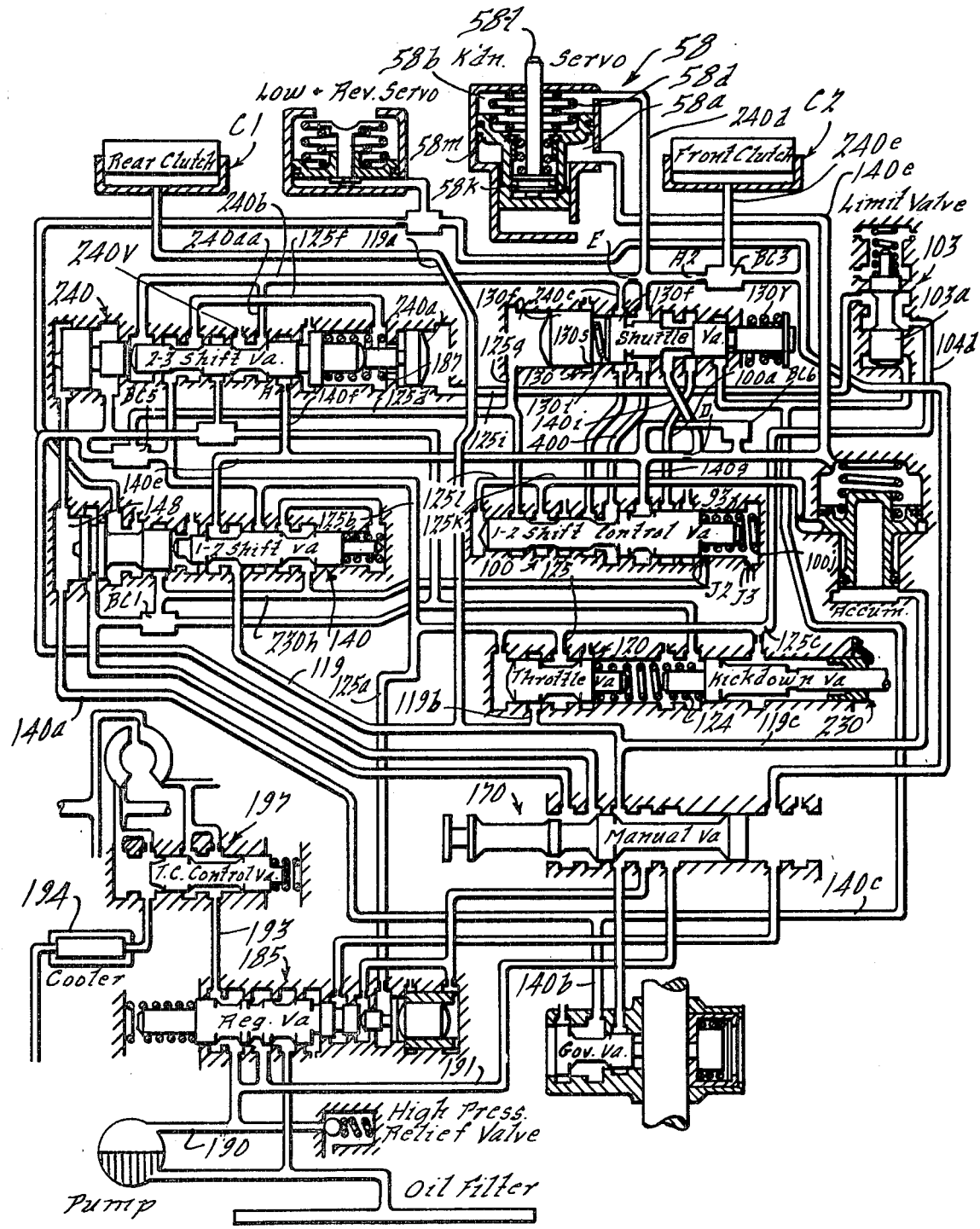

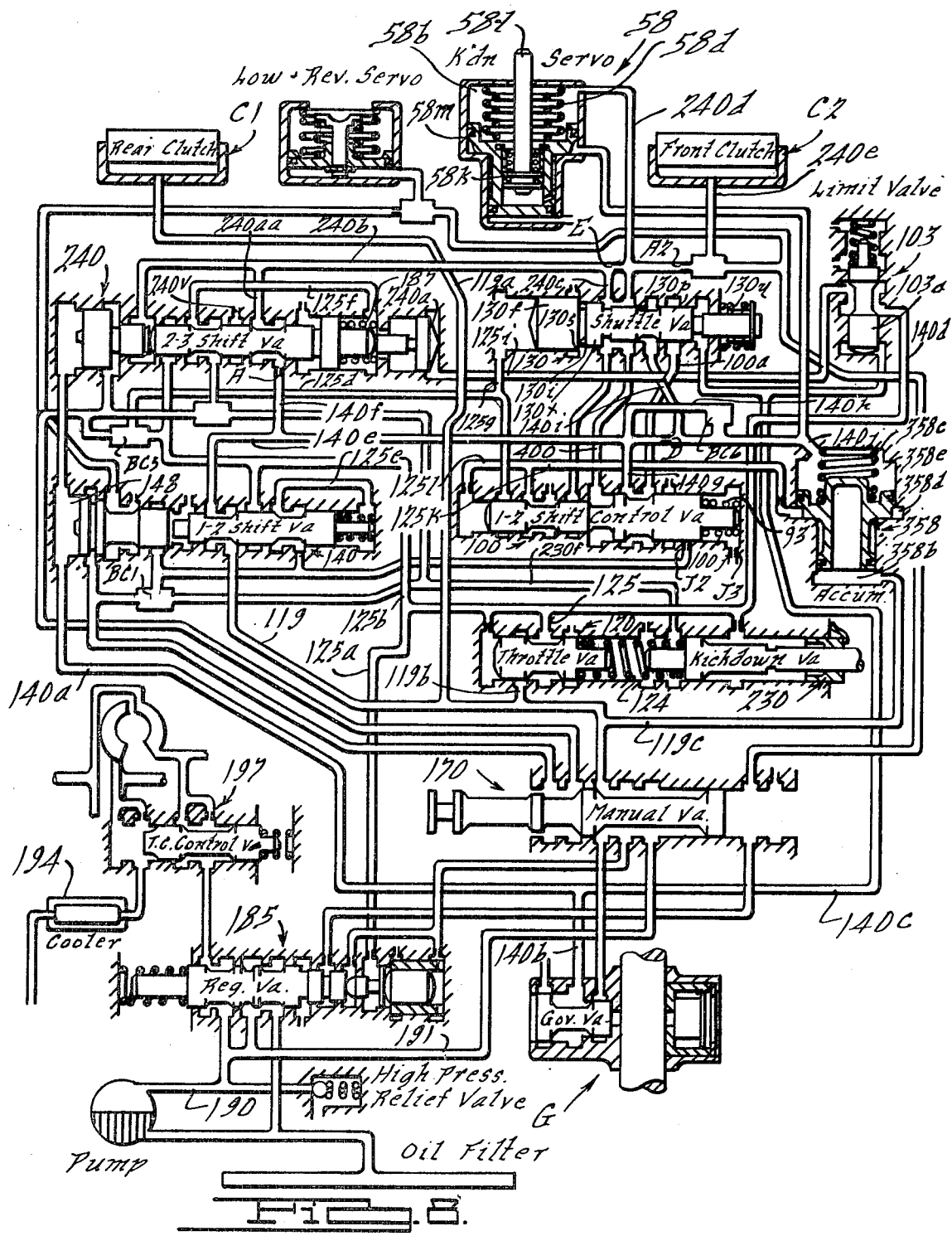

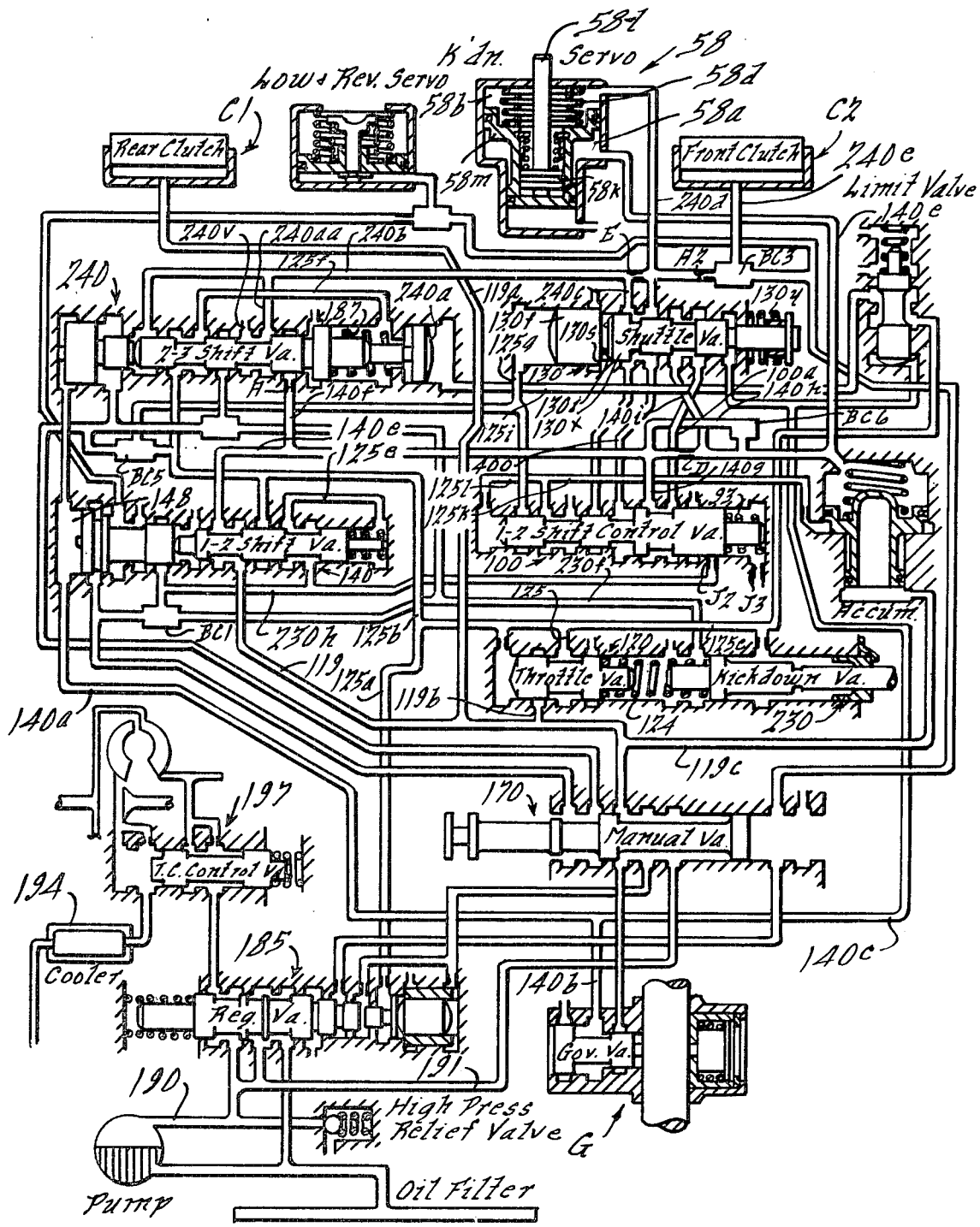

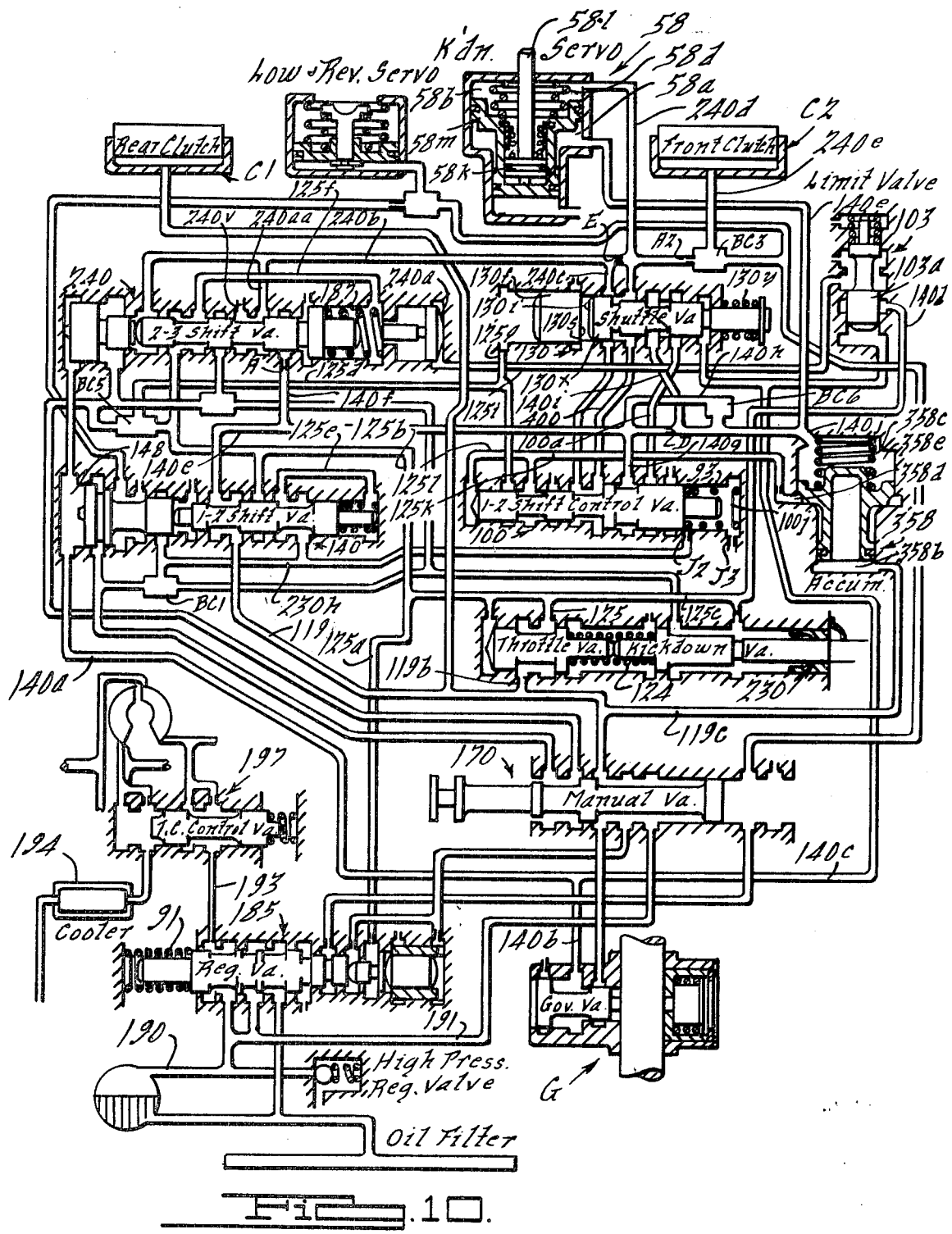

3,650,162

HYDRODYNAMIC TRANSMISSION

BACKGROUND OF THE INVENTION

This invention relates to a power transmission unit primarily intended for motor vehicle use and is particularly concerned with the controls for a transmission of this type that will function to automatically provide three different forward drive speeds and also a reverse drive, with novel means for controlling the changes in speed ratio in both upshifting and downshifting sequence. This invention is an improvement on the designs shown in L. F. Froslie U.S. Pat. No. 3,000,230, B. W. Cartwright et al. U.S. Pat. No. 2,932,990, and B. W. Cartwright U.S. Pat. No. 3,035,457.

SUMMARY OF THE INVENTION

Briefly, this invention comprises an automatic power transmission having means for improving shift quality.

One of the primary objects of this invention is to provide a three forward speeds and reverse drive motor vehicle transmission that utilizes a minimum number and the least complicated transmission elements with said elements arranged in a novel manner so as to provide a most favorable construction for a highly flexible, smoothly operating transmission control system.

Another object of this invention is to provide a transmission of the type described which provides more flexibility in controlling the capacity of each shift with interaction of the variables which affect several shifts.

A further object of this invention is to provide a transmission such as described which provides good kickdown quality through the speed range of the transmission.

Still another object of this invention is to provide a transmission of the class described which correlates the relationship between clutch and band forces during kickdown to provide better kickdown quality.

A further object of this invention is to provide a transmission such as described which is economical in construction and efficient in operation.

Other objects and advantages of this invention will be made apparent as the description progresses.

BRIEF DESCRIPTION OF THE DRAWINGS

In the accompanying drawings, in which one of various possible embodiments is illustrated, FIG. 1 is a schematic view of a motor vehicle drive train that includes a power transmission unit embodying this invention;

FIG. 2 is a sectional elevational view of the power transmission unit utilized in the disclosed drive train of FIG. 1;

FIG. 3 is a schematic line diagram of the power transmission unit shown in FIG. 2;

FIG. 4 is an enlarged fragmentary sectional view of the one-way brake mechanism associated with the guide wheel of the drive train torque converter device, the view being taken along line 4—4 of FIG. 2;

FIG. 5 is a diagrammatic view of the hydraulically operated control system for the transmission shown in FIG. 2, the controls being shown in Neutral condition;

FIG. 6 is another diagrammatic view of the transmission control system with the controls being shown set in Drive and the transmission conditioned for Breakaway for first forward speed;

FIG. 7 is another diagrammatic view of the transmission control system with the controls being shown set in Drive and the transmission conditioned for second forward speed;

FIG. 8 is another diagrammatic view of the transmission control system with the controls being shown set in Drive and the transmission conditioned for direct drive;

FIG. 9 is another diagrammatic view of the transmission control system with the controls being shown set in Drive and the transmission being kicked down from third forward speed to second forward speed under part throttle conditions;

FIG. 10 is another diagrammatic view of the transmission control system with the controls being shown set in Drive and the transmission being kicked down from third forward speed to second forward speed under wide open throttle conditions;

Like parts are indicated by corresponding reference characters throughout the several views of the drawings.

DESCRIPTION OF THE PREFERRED EMBODIMENT

Figure 11:
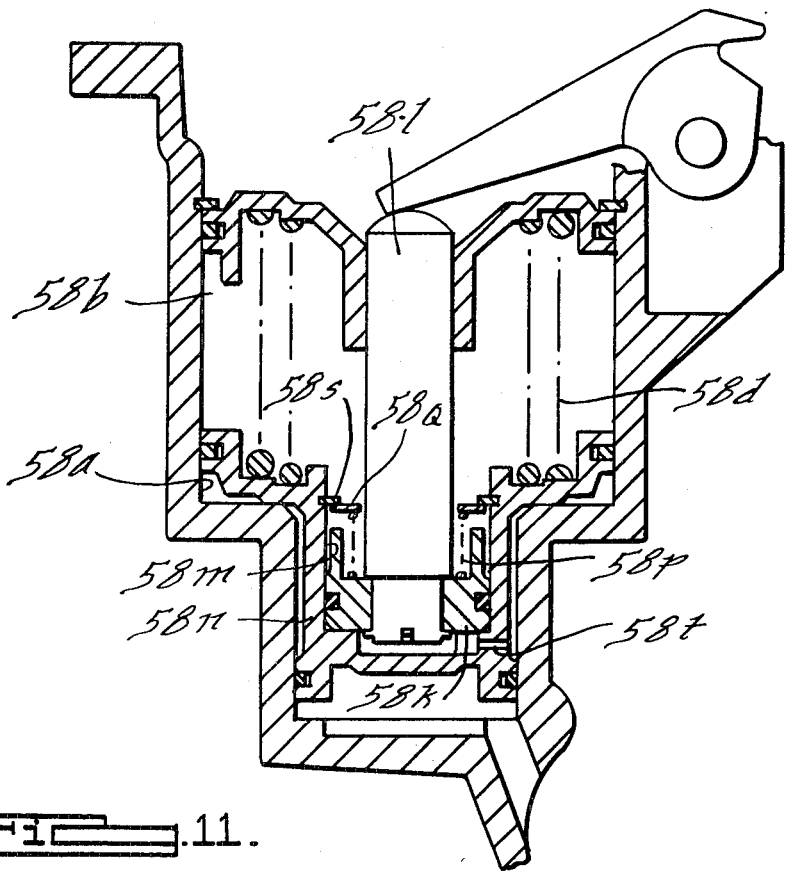
FIG. 11 is an enlarged sectional view of the kickdown servo used in the control system illustrated in FIGS. 5–12.

FIG. 1 of the drawings diagrammatically discloses a motor vehicle power plant and drive train comprising an internal combustion engine E drivingly connected to a power transmission unit that includes a hydrokinetic type of torque converter device A drivingly connected to a change speed gear box B. The output from gear box B drives a propeller shaft or drive shaft S that transmits drive through a differential unit T and axles X to the rear driving wheels W of the vehicle. The engine E has a carburetor F that is connected by an accelerator pedal AP through linkage L.

FIG. 2 of the drawings discloses the flow of power through the transmission unit that comprises the hydrokinetic torque converter A and the speed change gear box B arranged in a series connected drive transmitting relationship. The end portion of a driving member, such as the crankshaft of the engine E of the motor vehicle power plant is indicated at 1. The shaft 1 is drivingly connected to the drive transmitting ring 3 by screw means 5. The drive transmitting ring 3 is drivingly connected to the torque converter casing 7. The converter casing 7 has an engine starter ring gear 9 mounted on and extending about its periphery. Within the torque converter casing 7 are mounted the several vaned converter wheel elements, namely the impeller or pump member 11, the turbine or runner member 13, and the guide or reaction member 15. A pair of guide wheels may be used in place of the single guide wheel 15.

The vaned impeller wheel 11 is formed as an integral part of the converter casing 7 and is accordingly adapted to be rotatably driven by the driving shaft 1. The vaned turbine wheel 13 is drivingly connected by rivet means 17 to a radially extending flange portion 19 formed on the stub shaft hub member 21 of a shaft 23. Shaft hub member 21 is drivingly connected by splines 25 to the forward end portion of the torque converter driven shaft member 23.

The converter driven shaft member 23 is adapted to transmit drive from the turbine member 13 of the torque converter device A to the planetary gearing of the gear box unit B that is arranged rearwardly of and in series with the torque converter device A. The converter driven shaft 23 thus provides the input shaft to the gear box B. The forward end of shaft 23 is journaled in a bearing 27 that is piloted in an axially extending seat 29 formed in the hub of the torque converter casing 7. The rear end portion of converter driven shaft 23 is rotatably supported by the sleeve plate 32 carried by the front wall 42a of the gear box housing 42.

The varied converter guide wheel 15 is rotatably mounted within the converter casing 7 by means of the guide wheel hub portion 17a. Guide wheel hub portion 17a is supported by means of the one-way brake device 31 on the axial sleeve 32 of the housing portion plate 42a. The one-way brake 31 (see FIG. 4) is arranged such that it will permit only forward rotary movement (clockwise when looking from the converter A towards the gear box B) to be transmitted to the guide wheel 15 by the forward rotation of the impeller 11. The brake 31 continuously prevents rotation of the guide wheel 15 in a reverse or counterclockwise direction. The specific one-way brake 31 herein disclosed is shown in section in FIG. 4.

The torque converter unit A includes a gear type hydraulic pump 33 having a driving gear 32a that is directly connected by key means 32b to the rearwardly projecting end of an axially extending, sleevelike flange portion 7b of the rotatable converter casing 7. The pump 33 draws fluid from a supply sump 33a through a supply conduit 33b and circulates fluid through the converter A, the transmission lubricating system and the various hydraulically operated control mechanism associated with this power transmission (see FIG. 5).

The gear box B includes the forward drive clutch $C_1$, the direct drive clutch $C_2$, and the pair of planetary gear trains 50 and 60 that are adapted to cooperate with the torque converter device A to provide means for the transmission of three forward drives and a reverse drive to the propeller shaft S. The forward drive clutch $C_1$ is engaged whenever any of the three forward speeds is being utilized, and it is disengaged when the transmission controls are set in either Neutral or Reverse. The direct drive clutch $C_2$ is engaged only when the third or Direct forward speed is being transmitted or whenever Reverse drive is being transmitted. The different clutches and brakes that are applied for transmitting the several drive ratios obtainable with this transmission are set forth in the chart below.

| Drive ratio: | Members applied: |
| --- | --- |
| Low (first) | $C_1$ and $B_1$ or $O \cdot W \cdot B_1$ |
| Kickdown (second) | $C_1$ and $B_2$ |
| Direct (third) | $C_1$ and $C_2$ |
| Reverse | $C_2$ and $B_1$ |

The gear box B includes the housing 42 which may be considered to include front and rear portions. In the front portion of the housing 42 are located the clutches $C_1$ and $C_2$ and one planetary gear set 60 whereas the rear portion houses the planetary gear set 50 and the overrunning clutch $OWB_1$. The rear end of the converter driven gear box input shaft 23 pilots the forward end of the gear box output shaft 81. Output shaft 81 has its rear end portion journaled in sleeve portion 42c of the transmission housing rear wall 42d. Transmission input shaft 23 is drivingly connected at 23s to a spider element 35. The spider element 35 carries the friction clutch disc elements 41 of the reverse and direct drive clutch $C_2$. Clutch discs 41 are adapted to be drivingly engaged with the clutch discs 48 that are drivingly connected to the interior surfaces of a brake drum 43. Brake drum 43 is journaled on the rearwardly projecting collar 42f on the gear box housing front wall 42a. A brake band $B_2$ is arranged to be selectively applied to the brake drum to prevent rotation thereof. Brakedrum 43 mounts a backing plate 69 that cooperates with an axially shiftable piston 68 to effect drive transmitting engagement of the clutch discs 41, 48. A waved spring 70 located rearwardly of plate 69 cushions the application of clutch $C_2$. Springs 74 normally urge the piston 68 forwardly to clutch disengaged position. Brake drum 43 may include a ball check pressure fluid bleed valve 43b that is speed responsive and arranged to prevent unintended engagement of the clutch $C_2$ by the centrifugal action of any fluid that may be trapped in the piston bore 67. Pressure fluid for operation of the clutch $C_2$ is supplied to the piston bore 67 through the conduit 167 that is connected to the hydraulically operated control system (FIG. 5) described hereinafter.

Also drivingly mounted on the spider 35 and extending rearwardly therefrom is a clutch drum 30. Clutch drum 30 has drivingly and shiftably mounted on its interior face the clutch discs 28. Clutch discs 28 are arranged to be drivingly engaged with the clutch discs 45 that are carried by the exterior surface of the annulus gear 64 of the forwardly arranged planetary gear set 60. Clutch discs 28 and 45 are arranged to be drivingly compressed against the backing plate 47 by the pressure plate 49 that is actuated by the lever spring plate 34. A wave spring 34a is located in the rear clutch retainer or drum 30 to provide cushioning of the neutral to drive shift as disclosed in U.S. Pat. No. 3,236,349. Lever spring plate 34 is operated by the piston 51 that reciprocates in a cylinder bore 36 formed in the rear side of the element 35. Pressure fluid is supplied to the cylinder bore 36 in a manner described hereinafter. The piston 51 may mount a pressure fluid ball check bleed valve 35b that will prevent unintended engagement of the clutch $C_1$ by centrifugal force action on any fluid that might be trapped in the cylinder bore 36.

Arranged concentrically within the forward drive clutch $C_1$ is the forwardly located planetary gear set 60. This gear set comprises the annulus gear 64, the sun gear 61, the planet pinion gearing 62 connecting gears 61, 64, and the planet pinion gear carrier 63 that rotatably supports the pinion gearing. Pinion gearing carrier 63 is splined to the output shaft 81 at 82. Annulus gear 64 is supported through its radially extending plate portion 64a on a hub portion 64b that is connected to the hub 63a of the planet gear carrier 63. The forward end of hub 63a can react against a retaining ring 53 connected to shaft 81. The sun gear 61 is an integral part of the double sun gear sleeve 85. Sleeve 85 has the sun gear 61 formed on the front end thereof and the sun gear 55 of the planetary gear set 50 is formed on the rear end thereof. Sun gear sleeve 85 is journaled on the output shaft 81 by means of sleeve bearings 86.

The rearwardly located gear set 50 includes the sum gear 55, the annulus gear 54, the planet pinion gearing 52 that connects the gears 55, 54, and the planet pinion gear carrier 57 that rotatably supports the pinion gearing 52. Annulus gear 54 is drivingly connected to the output shaft 81 by the splines 87. Pinion gear carrier 57 is drivingly connected at 88 to a brake drum 89 that is adapted to be engaged by the brake band $B_1$. Brake drum 89 has a hub portion 89a that is journaled on the forwardly projecting collar 42c of the rear wall 42d of the transmission housing 42. Hub portion 89a of the annulus gear 89 is restrained against reverse rotation, counterclockwise, when looking from the front towards the rear of the transmission, by means of the one-way brake device $O.W.B._1$, which is similar to the brake device shown in FIG. 4.

Interconnection between the two axially spaced adjacent gear sets 50, 60 is by way of the common sun gear sleeve 85 and by way of the dual connections of the front carrier 63 and the rear annulus gear 54 to the common output shaft 81.

Mounted on the rear end of the output shaft 81 is a sprag gear 95 that is adapted to be engaged by a parking sprag 93. Also mounted on the rear end of the output shaft 81 is the hydraulic governor device G that is part of the transmission control system to be described. This governor may be of the type shown in detail in U.S. Pat. No. 2,697,363 to W. L. Sheppard. Obviously, other types of governors could be used to provide a vehicle speed responsive control for the control system of the transmission.

It is thought to be obvious that the valve body 99 that includes the several fluid control mechanisms for this automatic type of three forward speeds and reverse drive transmission will be mounted in the transmission oil sump 33a.

With the aforesaid gear box when the transmission is set in Neutral by proper positioning of the transmission shift selector mechanism (not shown) the hydraulic control system to be described prevents the application of pressurized fluid to either of the servos 58 and 59 that are used to apply the braking bands $B_1$ and $B_2$. When clutch $C_1$ is disengaged, the torque converter-driven, gear box input shaft 23 is disconnected from the gear box gear set 60 so there can be no drive input to either of the gear sets 50, 60 through the sun gears 55, 61 of the gear sets.

When the drive ratio selector mechanism, not shown, is set for initiation of drive in the Drive ratio, the forward drive clutch $C_1$ is automatically engaged and this transmits drive to the gear box planetary input gear 64. Neither of the braking bands $B_1$ or $B_2$ nor the clutch $C_2$ is engaged at this time. The one-way brake $O.W.B._1$ prevents reverse rotation of the carrier 57 at this time and this one-way brake device provides the reaction for the compounded gear sets 50 and 60 which cooperate to transmit the one-way Low or first speed forward drive to the gear box output shaft 81. This Low speed drive passes from the input shaft 23 through the engaged clutch $C_1$, and then to the annulus gear 64. Annulus gear 64 acts on the planet pinion gears 62 and causes rotation of the sun gear 61 backwards because the load on the output shaft 81 tends to anchor the planet pinion carrier 63 against rotation. Rotation of the sun gear 61 backwards rotates the sleeve 85 and the sun gear 55 backwards. The sun gear 55 rotating backwards acts on the planet pinions 52 and tends to rotate the pinion gear carrier 57 backwards because of the output shaft load on the annulus gear 54. Due to the one-way brake device O.W.B.$_1$ the carrier 57 cannot be rotated backwards and the pinion gears 52 are then active to drive the ring gear 54 and connected output shaft 81 forwardly. Due to the connection of both the carrier 63 and the annulus gear 54 to the output shaft 81 and due to the anchoring of carrier 57 by brake O.W.B.$_1$, at this time part of the torque of the input shaft 23 is transmitted directly to the output shaft 81 by the planetary gear set 60 and the other part of the input shaft torque is delivered to the output shaft 81 through the compounded gear sets 50 and 60. The starting Low drive when the transmission is set for Drive, or any other forward drive ratio for that matter, thus passes through both of the gear sets 50 and 60 with the reaction normally provided by the one-way brake device O.W.B.$_1$.

When Second speed is to be attained by an upshift from starting Low, it is merely necessary to apply braking band B$_2$ while the forward drive clutch C$_1$ remains engaged. This anchors the rotatable sleeve 85 that carries the sun gears 55 and 61. With sun gear 61 anchored, the planetary gear set 60 is activated to directly transmit a forward Second speed drive from annulus 64 to pinions 62 to the output shaft 81 by way of the carrier 63. Planetary gear set 50 is inactive at this time and its pinion gear carrier 57 is driven forwardly which causes it to overrun the one-way brake device O.W.B.$_1$. Braking band B$_1$ and clutch C$_2$ remain disengaged when the transmission is conditioned for Second speed forward drive. It will be noted that no braking band need be released on an upshift from Low to Second because the Second speed can lift off the one-way brake O.W.B.$_1$ when band B$_2$ is applied to activate Second speed and likewise no braking band need be applied on an automatic downshift from Second to Low for the drive can drop down onto the one-way brake device O.W.B.$_1$ as the band B$_2$ is released.

Third forward speed or direct drive is achieved by an upshift from second that results from the engagement of the direct drive clutch C$_2$ at the release of band B$_2$. The forward drive clutch C$_1$ remains engaged when in Third forward speed while bands B$_1$ and B$_2$ are each released. Engagement of clutch C$_2$ while clutch C$_1$ is engaged connects the annulus gear 64 and the sun gear 61 of the planetary gear set 60 and this locks up the gear set 60 for the transmission of a direct 1:1 forward drive. Locking up gear set 60 also locks up gear set 50 because of the interconnection between the several elements of these two gear sets.

Reverse drive is obtained by placing the selector lever (not shown) in the proper position. This action engages the clutch C$_2$ and applies brake band B$_1$ while the clutch C$_1$ is disengaged and he braking band B$_2$ is released. With clutch C$_1$ disengaged there is no drive input to the annulus gear 64. Drive input is from the input shaft 23 through the clutch C$_2$ and a drum 92 to the sun gear 55. As braking band B$_1$ is applied the carrier 57 is anchored and the output shaft mounted ring gear 54 is driven in a backwards or reverse direction by the gear set 50. Planetary 50 is thus effective to transmit the Reverse drive.

For a coasting low speed ratio, for use as a brake or for continuous low speed operation, the braking band B$_1$ can be applied at the same time that the one-way brake O.W.B.$_1$ and the forward drive clutch C$_1$ are engaged. Movement of the selector lever (not shown) into Low will produce an effective coast brake ratio in the transmission. The one-way brake O.W.B.$_1$ cannot be relied on for a coast brake because it would permit carrier 57 to overrun at certain vehicle speeds.

For a coasting second speed ratio, for use as a coast brake or for limiting the transmission to an automatic two-speed operation, or for effecting a downshift to Second speed drive from the Third speed or direct drive, the selector lever may be placed in Second position. The actual effect on the various control system mechanisms will depend on the transmission condition of operation at the time the lever is placed in "D2" position. The D2 or Second position thus provides a means for readily overruling the automatic controls that normally control the transmission when the lever is in Drive.

Referring now to FIG. 5, pressure fluid from the supply pump 33 is directed into a supply conduit 190. Conduit 190 intersects a main conduit 191 connected to the inlet port of the manually operable drive ratio selector valve 170. The pressure of fluid in conduit 191 is controlled by the pressure regulator valve 185 and this controlled intensity pump supplied pressure fluid is denoted "line" pressure (usually 55–90 p.s.i. in forward drives) for purposes of the description hereafter.

When the manual ratio control valve 170 is located in the Neutral position (FIG. 5) certain valve lands of this plunger or spool-type element 170 close off the escape of pressurized line pressure fluid from valve 170 to the associated transmission drive control mechanisms and thus line pressure fluid cannot pass from conduit 191 through valve 170 to activate any of the forward or reverse drive ratios. However, it should be noted that when the manually controlled ratio selector valve 170 is placed in Neutral position with the vehicle engine running, line pressure fluid from such pump can still be directed into and through a conduit 192 to the line pressure regulator valve unit 185, and also through valve unit 185 to a conduit 193 that is connected to a torque converter control valve 197. The torque converter control valve 197 regulates the pressure of fluid supplied to the torque converter to approximately 30–55 p.s.i. A conduit 193 includes a restriction 195 therein for partially controlling the rate of flow of the fluid directed to converter A. Pressurized fluid passing through converter A is passed through valve 197 and then through a cooler 194, a pressurized transmission lubrication system and back to the sump 33a. The control valve 197 controls pressurization of the converter and prevents rotor wheel cavitation, frothing in the converter and/or "blowing" of the converter fluid into the sump 33a under abnormal conditions.

In the forward drive ratio positions Drive, D1 and D2 of the drive ratio selector valve 170, line pressure fluid from supply conduit 191 will always be directed through the ratio control valve unit 170 and into the line pressure supply conduits 119, 119a, 119b, and 119c that respectively connect the valve 170 to a 1-2 shift valve 140, the rear clutch C$_1$, a throttle valve 120 and an accumulator 358. The throttle valve 120 is a pressure regulating valve which provides pressure in accordance with throttle opening, ranging from zero pressure at closed throttle to approximately 90 p.s.i. at wide open throttle. The throttle valve 120 is a spring-loaded 124 two land spool valve located in a bore in the valve body next to the manual valve 170. As is known, variable throttle pressure is obtained by increasing or decreasing the spring load by means of a kickdown valve 230, actuated by the throttle linkage (not shown).

As the accelerator pedal is depressed, the kickdown valve is pushed "in" to increase the spring load and thus the throttle valve 120 regulates at a higher pressure, i.e., it allows the throttle pressure to increase. The increased throttle pressure acting against the reaction area moves the throttle valve back against the spring load to throttle the line pressure. As the accelerator pedal is released, the kickdown valve moves back decreasing the spring load. The throttle valve will move in slightly to cut off the vent as soon as throttle pressure and the spring load are balanced. The connection with the throttle valve 120 insures that a form of torque responsive fluid control is always available to cooperate with the driven shaft speed responsive governor G to conjointly control automatic operation of the transmission in all forward drive ratios.

The conduit 119c is connected to the "apply" side of the accumulator and supply line pressure thereto whenever valve 170 is in either Drive or Low or Second ratio. Line pressure is also supplied to the rear clutch C$_1$ in these modes. Thus, whenever valve unit 170 is set for Drive or Low or Second speed the clutch C$_1$ is engaged and the torque converter turbine driven shaft 23 is drivingly connected through clutch $C_1$ to the planetary annular gear 64.

The connection of conduits 119a and 119c by conduit 119 to line pressure whenever a forward drive is transmitted, connects the rear clutch $C_1$ to the fluid filled apply chamber 358b of the accumulator. Thus, engagement of the clutch $C_1$ is always cushioned by the fluid that is resiliently contained in the accumulator chamber 358b and the spring 358c.

At closed or idle position of the accelerator pedal (not shown) with the manual control valve 170 set for any one of the forward drive ratios Drive, D1 or D2, the arrangement of the throttle valve 120 is such as to permit pressurized fluid to be fed from the line pressure supply conduit 119b, past valve 120 to the conduit 125, and then into branch conduits 125a, 125b and 125c. The pressure of fluid passing through valve 120 will usually be lower than the line pressure supplied thereto by conduit 119b except in wide open throttle condition due to the reducing valve action of valve 120 as described above. This reduced or compensated line pressure is denoted "throttle" pressure hereafter.

The throttle pressure admitted to the conduit 125b is applied to a 1-2 control valve 100 through a ball check BC5 and a line 125d. Throttle pressure is also admitted through line 125b to 1-2 shift valve unit 140 and a 2-3 shift valve unit 240. Connector conduits 125e and 125f permit the throttle pressure applied to valves 140 and 240 to be applied to the spring ends of such valves. The throttle pressure is also applied through a conduit 125d to a shuttle valve 130. This throttle pressure is also applied to a reaction end 240a of 2-3 shift valve 240 through line 125c through a limit valve 103 and through a line 125i. The regulator valve 185, utilizing this throttle pressure on plug 185a and the spring force of a spring 91, regulates the line pressure. The limit valve 103 performs no operative function during this driving mode and merely forms a connection between conduits 125c and 125i. The throttle pressure applied to the shift valve units 140 and 240 provides a form of engine torque control for these shift valve units.

When the control system is in the FIG. 6 mode, a spring 93 biases the 1-2 control valve to the left as viewed in FIG. 6. As soon as land 95 of the valve uncovers the port to which line 125d is connected, pressure is applied through a line 125k to the middle area 358d of accumulator 358. This pressure is equal to or less than the throttle pressure in lines 125d, and is also applied through a line 125l to a reaction area of the 1-2 control valve. The pressure of the fluid on the reaction area opposes the force of spring 93 and the valve 100 thus meters fluid from the throttle pressure lines to the line 125k. The force produced by the pressure in the intermediate area 358d of the accumulator 358 supplements the force produced by the line pressure in the area 358b of the accumulator to keep the piston of the accumulator in the FIG. 6 position.

At the left end of 1-2 shift valve 140 is a chamber 148 that is connected by a conduit 140a to a line 140b from the governor valve G. A line 140c extends from the junction of conduits 140a and 140b to the shuttle valve 130. The line 140c is connected at 140d to a reaction end area 103a of limit valve 103. Conduit 140a pressurizes the valve bore chamber 148 of valve unit 140 with a "governor" pressure fluid in which the fluid pressure/intensity is proportional to the speed of the transmission output shaft. As made apparent hereinafter, the governor pressure is insufficient to move the limit valve 103 from its FIG. 6 position except when the vehicle speed is above a predetermined value, such as 40 m.p.h., for example. It is believed apparent that a rightwardly directed force will act upon the left end of valve 140 that is proportional to the speed of the vehicle and this force will tend to shift the valve 140 towards the right end of the valve unit, i.e., to the position shown in FIG. 6. At a predetermined speed relative to throttle pressure, the governor pressure in chamber 148 will have moved the shift valve to its FIG. 7 position. The throttle pressure from line 125b is cut off and the line pressure from line 119 is transferred around the piston of valve unit 140 to a line 140e. Line 140e is connected by a branch line 140f to 2-3 shift valve unit 240. A line 140g connects line 140e to valve unit 100. A bypass line 140h which includes a ball check valve BC6 extends around a restriction or orifice "D" and a line 140i connected to the shuttle valve 130. Conduit 140e is also connected as indicated at 140j to a spring chamber 358e of accumulator 358. The conduit 140e is connected at its other end to central area 58a of the kickdown servo 58 and applies line pressure to the central area of the servo to move the latter from its FIG. 6 position to its FIG. 7 position in which the brake band B2 will be applied.

As the chamber 358e is exposed to line pressure from line 140e, the force of the line pressure in chamber 358b and of the pressure in area 358d from line 125k is overcome by the spring 358c and the pressure in chamber 358e.

The 1-2 control valve provides three stages of capacity as the throttle is opened to match the capacity of the engine as determined by the shift pattern. The early or light throttle shift capacity increases rapidly with the throttle opening due to the application of pressure through line 125k to the middle chamber 358d of the accumulator 358. The mid-throttle range has very little change in shift capacity. This is accomplished by regulating the pressure substantially constant to the middle area 358d of the accumulator through the 1-2 control valve 100. The wide open throttle capacity is increased to handle the added inertia energy by raising the pressure in the middle area 358d of the accumulator. This increased pressure results from the application of wide open kickdown throttle pressure to the spring end of valve 100 as explained hereinafter.

Each upshift, at a given throttle opening, is initiated slowly by forcing the kickdown servo apply fluid through orifice D and by the use of a high rate but short accumulator spring 358c. The capacity at the end of the shift is held constant so that the final step into second gear torque level is less severe. This is accomplished by removing the spring load, applied by spring 358c, during the last portion of its travel, i.e., after the spring 358c goes to free height the kickdown servo pressure regulated by the accumulator will remain constant.

Figure 12:
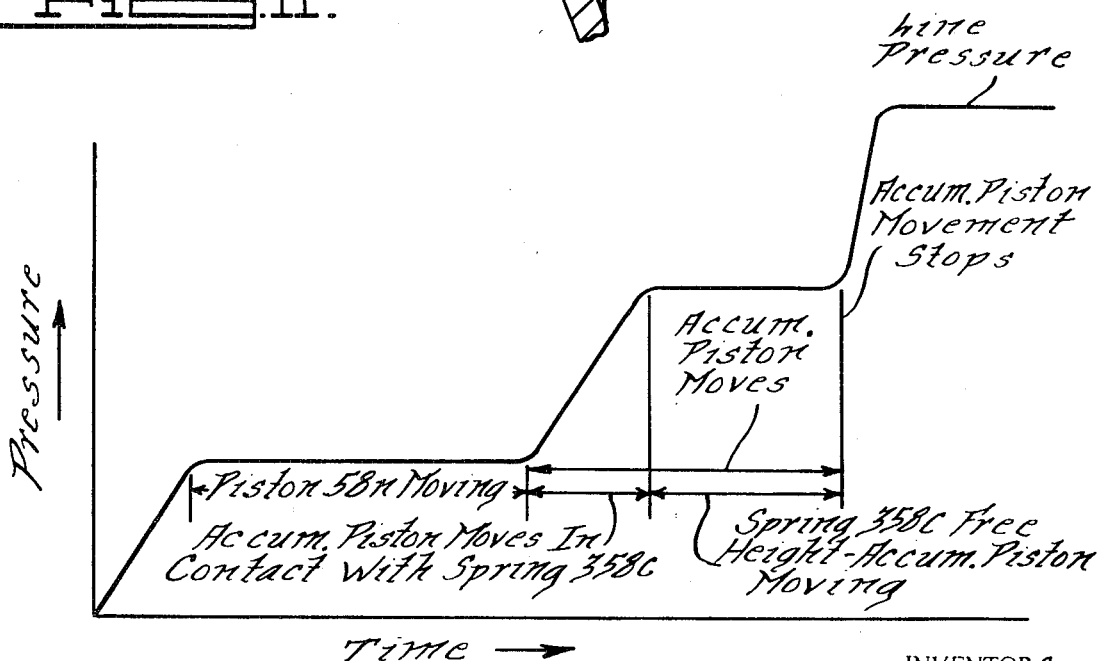
FIG. 12 is a graph of pressure applied to a brake band servo as a function of time for a given throttle pressure.

The control of the application of the kickdown servo 58 provided by the 1-2 shift control valve is illustrated by the graph in FIG. 12 which plots the pressure applied to the kickdown servo 58 as a function of time for a given throttle pressure.

Figure 13:
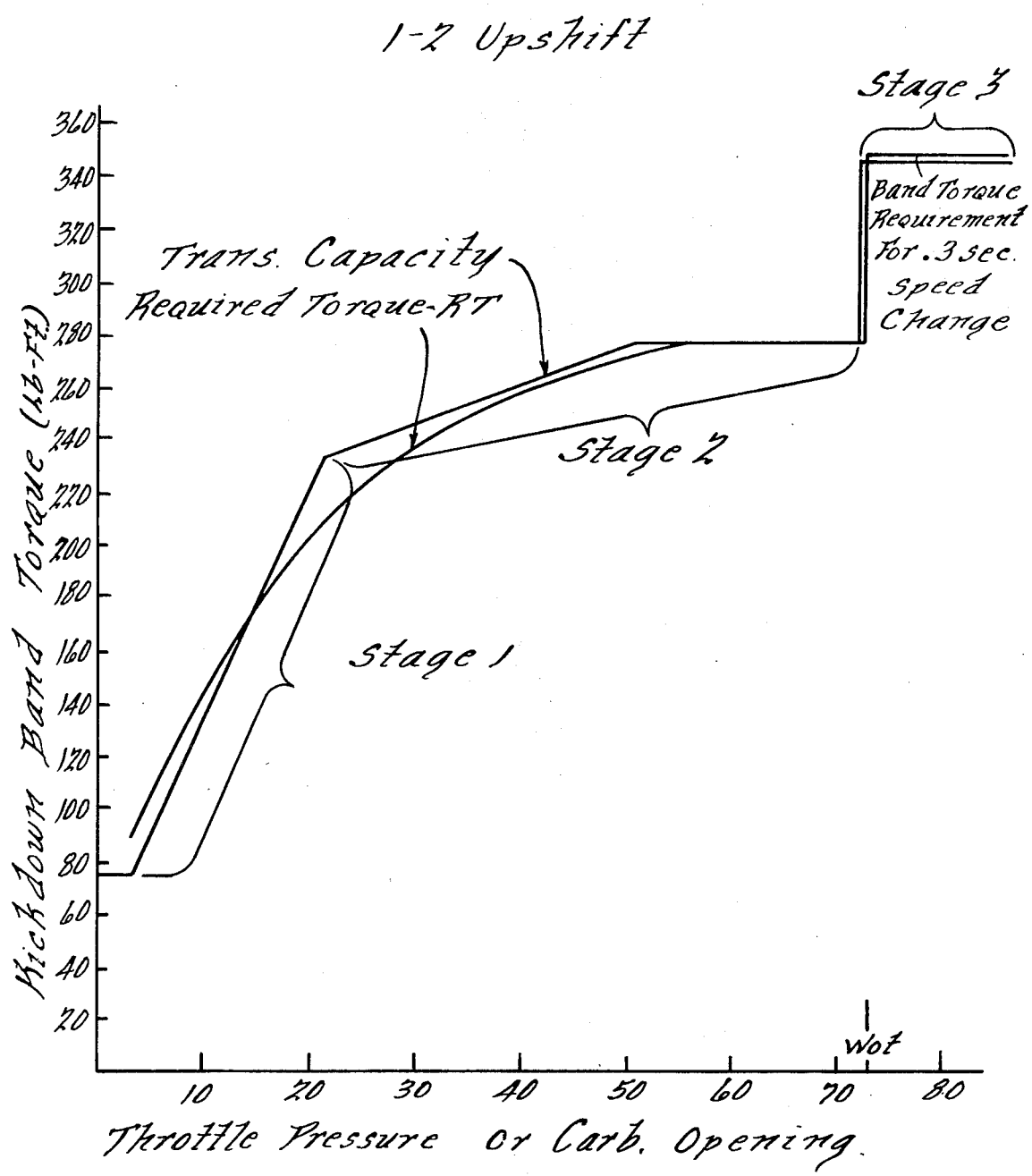
FIG. 13 is a graph of kickdown band torque vs. throttle pressure for this apparatus.

In FIG. 13 the band torque required to complete shifts from first to second in 0.3 second, for example, is shown generally by line RT. The apparatus of this invention causes the kickdown band torque, i.e., transmission shift capacity to generally correspond to the required torque line RT, and this in turn provides substantially optimum shift quality, i.e., smoothness without sacrifice of endurance. It will be seen that the three stages of shift capacity referred to previously are identified by stages 1, 2 and 3, respectively.

It will thus be seen that when pressure is applied through conduit 140e to chamber 58a of servo unit 58, to effect engagement of band $B_2$, that branch conduit 140j also applies pressure to the chamber 358e of the accumulator 358. Pressure directed to chamber 358e acts, with the assistance of spring 358c, to force fluid out of chamber 358b and 358d. The servo release back pressure in chamber 58b is kept low during the 1-2 shifts by providing a bypass around an "E" orifice as described hereinafter.

Automatic operation of the direct drive clutch $C_2$ and the release of the second speed or "kickdown" servo unit 58 will effect the shifts between second and third speeds. This shifting is accomplished by the 2-3 shift valve 240. It will be noted that line pressure, which is relatively high is conducted to the 2-3 shift valve 240 by the conduit 140e, 140f. At relatively low output shaft speeds with the drive ratio valve 170 set for Drive, the throttle pressure applied to the right hand end of valve 240 through 125f will cause the latter to be positioned in the FIG. 7 position to prevent the transfer of line pressure from conduit 140e and 140f through valve 240 and out into a conduit 240a. On 2-3 upshift, governor pressure overcomes the combined force of throttle pressure and the force exerted by a spring 187, and the valve 240 upshifts from the FIG. 7 position to the FIG. 8 position with the same "snap" action as the 1-2 shift valve. In the upshifted position of the 2-3 shift valve, line pressure is transmitted to line 240aa, which is connected by a conduit 240b to a bypass 240c through the shuttle valve 130 around orifice E. Bypass 240c is connected by a conduit 240d to the kickdown servo release area 58b and by a conduit 240e to the front clutch $C_2$. Conduit 240e includes an orifice $A_2$ and a ball check valve BC3. The line pressure in release area 58b causes the servo rod 58-1 to release the band $B_2$. As made apparent hereinafter, a secondary piston 58k moves with respect to a primary piston 58n for a purpose to be made apparent. Thus, direct drive clutch $C_2$ will be applied and brake band $B_2$ released so that a direct or third speed forward drive is then transmitted through the torque converter A and the locked up gear trains 50, 60 whereby a drive of almost a 1 to 1 ratio is transmitted to the output shaft 81.

On a normal upshift, the throttle pressure in a line 125g biases the shuttle valve plug 130f toward a stop 130s and against a spring 130i and governor pressure in conduit 140c biases the shuttle valve 130 against the spring 130i leaving the E orifice bypass 240c open so that the clutch engagement is relatively rapid and the transmission is in direct drive as soon as the kickdown band is released, permitting no "engine runaway" with resultant rough shift quality. In addition, servo force and pressure balance across the servo 58 assure that the clutch $C_2$ will have sufficient capacity before the band is released. The orifices A and $A_2$ and waved spring 69 prevent shifting from being too abrupt.

On a lift foot upshift from second to direct drive, there being no throttle pressure in line 125d, the shuttle plug 130f moves out or to the left as viewed in FIG. 8, reducing the spring load applied by spring 130i on the shuttle valve. Governor pressure in line 140c and the front servo release pressure force in line 240d move the shuttle valve to the left as viewed in FIG. 8 to connect the kickdown servo apply circuit 140e with the release circuit 240c and 240d, regulating the pressure on both sides of the main servo piston until the piston return spring 58d releases the brake band. Then pressure builds up to apply the clutch $C_2$, so that there is a delay between the release of the band and engagement of the clutch. During this period, the engine slows down from the 1.45-1 ratio of drive second to about the 1-1 ratio of direct drive so that when the front clutch engages it does so with very little shock. This inherent conflict between the band and clutch is reduced by the use of the waved spring 70 in the front clutch pack (see FIG. 1) and the use of the $A_2$ orifice. At light throttle pressure the waved spring cushions the speed change by allowing a slow buildup of clutch capacity due to a pressure drop across the $A_2$ orifice.

Kickdown from direct drive to second is accomplished by depressing the accelerator (not shown). During part throttle conditions, i.e., at speeds up to approximately 40 m.p.h., the various parts are moved from their FIG. 8 position to the position shown in FIG. 9. In the transition between FIGS. 8 and 9 the kickdown servo 58 goes from a release condition to an apply condition to engage brake band $B_2$. When the accelerator is depressed, the throttle pressure in conduits 125c and 125i is increased, thus causing 2-3 shift valve 240 to move to the left from its FIG. 8 position to its FIG. 9 position. Movement of 2-3 shift valve to this position interrupts the line pressure applied to line 240aa and 240b, to prevent further application of line pressure to the release chamber 58b of servo 58, and chamber 58b is vented. Since line pressure is applied to the apply chamber 58a through line 140e, conduit 140g, 1-2 control valve 100, a line 100a, shuttle valve 130, and a line 140i back to line 140e, thereby bypassing restriction or orifice D. The shuttle valve 130 has moved from the FIG. 8 position wherein communication between conduits 100a and 140i is blocked by an enlarged land 130p to the FIG. 9 position wherein communication between conduits 100a and 140i is established as a result of decrease in the pressure in line 240d which was reacting against land 130x, thus permitting spring 130y to move the valve 130 to the FIG. 9 position. No restrictions are placed in the apply pressure circuit during low speed part throttle conditions because the movement of the shuttle valve 130 from its FIG. 8 position to the right places line 100a in communication with line 140i and the 1-2 shift control valve 100 is in the direct gear position, i.e., moved to the right as shown in FIG. 8.

Mid-range and "top end" speed range part throttle conditions result in good shift quality due in part by the use of a small secondary piston 58k on the end of a servo actuating rod 58-1. Piston 58k moves in a cylindrical bore 58m (see FIG. 11) in the main or primary piston 58n of the kickdown servo. A spring 58p rests on a stop ring 58q and biases the secondary piston towards the closed end of the cylinder or bore 58m. Stop ring 58q is biased by spring 58p against a seating ring 58s. Fluid may be supplied to the bore 58m between the end thereof and piston 58k from chamber 58a through a port or orifice 58t. Orifice 58t controls the pressure in the space between secondary piston 58k and the end of bore 58m when the band is being applied during kickdown.

The secondary piston 58k provides a hydraulic cushion for the application operation, i.e., the piston 58k provides a small, and relatively constant, amount of band torque on drum 43 for a period of time as the band is applied. This increases the probability that the kickdown change will be completed with low band torque, and thus provide good kickdown shift quality.

During a kickdown operation, both chambers 58a and 58b are initially at line pressure as shown in FIG. 8. At such pressure spring 58d has placed the piston 58n in the seated position shown in FIG. 8.

The fluid between the piston 58k and the closed end of bore 58m is also at line pressure. The net force exerted by fluid on the piston 58k is equal to line pressure times the cross sectional area of the rod 58-1, and this force overcomes the biasing action of spring 58p, thus holding piston 58k against stop 58q. The rod 58-1 in this position does not apply any pressure to band $B_2$.

When the 2-3 shift valve 240 moves from the FIG. 8 position to the FIG. 9 position as a result of increased throttle pressure on reaction areas 240a, the pressure in chamber 58b is reduced through lines 240d, 240b and 240aa to the vent 240v. The pressure in 58a causes the primary piston 58n, secondary piston 58k and actuating rod 58-1 to move as a unit towards band application position. After a short movement, the rod will be prevented from further movement due to the application of the band $B_2$ to the drum 43. The primary piston 58n will continue to move under the influence of the pressure in chamber 58a with the fluid in the space between piston 58k and the end of bore 58m being forced into chamber 58a through orifice 58t as such space is reduced when the piston 58k becomes fixed and piston 58n continues to move.

The movement of the large piston 58n after the small piston 58k has stopped provides a controlled force on the band $B_2$ by maintaining pressure between piston 58k and the end of bore 58m; and also maintains moderate pressure on the clutch $C_2$. Thus, a controlled overlap is provided between engagement of the band $B_2$ and disengagement of clutch $C_2$, and this significantly improves the tolerance of the transmission to misadjustment of the band $B_2$ and other variables, since the critical timing and adjustment requirements of a good clutch to band kickdown are reduced.

Under wide open throttle conditions the capacity of the kickdown shift is regulated by the movement of the accumulator piston from its FIG. 8 position through a pumping action movement back to its original position, also shown in FIG. 10. The movement of the accumulator piston is caused by the increase in pressure in the space 358d and reduced pressure in 358c due to the apply action of the kickdown servo. Since the throttle valve 120 is moved to the FIG. 10 position by the kickdown valve the line pressure in conduit 119b is placed in more direct communication with line 125 and causes the pressure in the latter to increase.

Limit valve 103 is moved from its FIG. 8 position to the FIG. 10 position as a result of the pressure applied to the lower end of the limit valve through line 140c which is connected to the governor G by line 140b. Movement of the limit valve to its FIG. 10 position occurs when vehicle speed is approximately 40 m.p.h. or greater and prevents the application of throttle pressure through line 125i to the plug 240a at the right end of the 2-3 shift valve 240, thus preventing 3-2 part throttle kickdowns from occurring. As a result, valve 103 thus limits part throttle kickdowns to approximately 40 m.p.h. and below.

Automatic upshifts and downshifts between the several drive ratios heretofore described are accomplished by the hydraulically actuated, automatic snap action shifting of the shift valves. In addition, driver controlled downshifts or kickdowns from direct drive to second and the starting drive ratio can be accomplished by driver depression of the accelerator pedal (not shown) to a predetermined open throttle position.

SEQUENCE OF OPERATION

With the selector lever (not shown) in the neutral position, and the valve 170 in neutral position (FIG. 5), as soon as the engine is started, the rotation of the torque converter impeller 11 causes oil pump 33 to rotate and build up fluid pressure and fluid flow. The pressure fluid from pump 33 is directed through conduit 190 to the regulator valve 185 and to line 191. Fluid flows in line 198 from the juncture of line 191 and 190 in one direction through valve 185 and to torque converter control valve 197, and in the other direction to manual valve 170. Since the manual valve is in neutral position, no pressure is transmitted to the remaining several hydraulic operating units, valves and clutches and consequently no torque is transmitted to the vehicle drive wheels. The line 190 is connected through valve 170 to line 192 which is connected to regulator valve 185. When the pump 33 reaches a predetermined pressure, such as 90 p.s.i., for example, the regulator valve 185 moves to the left as viewed in FIG. 5 and permits fluid from line 190 to be returned directly to the oil filter and pump intake line.

The rate of flow to the converter A is metered by orifice 195 in the conduit 193. The fluid leaves the converter A and is returned to the cooler 194, the lubrication system and sump 33a. If, for any reason, the pressure in line 190 should reach some predetermined value, such as 300 p.s.i., for example, a relief valve 300 will open to relieve pump output to sump 33a.

DRIVE (D) BREAKAWAY

When the selector lever is placed in the Drive (D) position (see FIG. 6) the manual valve 170 is moved to the left connecting conduit 191 to conduit 119 and line pressure is admitted to rear clutch $C_1$ and to the chamber 358b of accumulator 358. The engagement of the rear clutch is cushioned by the accumulator piston moving against spring 358c and the wave spring 34a in the clutch $C_1$.

Line pressure is also transmitted to the throttle valve through line 119b, to governor valve G and the 1-2 shift valve 140. There is no further transmission of the line pressure from 1-2 shift valve 140 because the line pressure ports are blocked by valve lands. However, throttle valve 120 calibrates a pressure in accordance with throttle opening, and transmits this pressure to the 1-2 control valve 100 through lines 125b and 125d and to the 2-3 shift valve 240 through line 125c, limit valve 103, and line 125i. The throttle pressure is also transmitted to the 1-2 shift valve, the 2-3 shift valve and the shuttle valve 130 through lines 125b, 125d and 125g.

BREAKAWAY OPERATION

The power flow is from the converter turbine 13 through the input shaft 23 and rear clutch $C_1$. Since the clutch $C_1$ is engaged, the power is transmitted through the rear clutch $C_1$ to the annulus gear 64. The annulus gear 64 drives the kickdown planet pinions 62, rotating them in the same direction. The planet pinions 62 being meshed with the front sun gear 61 rotate it in an opposite direction. The two sun gears 61 and 55, being integral, rotate in the same direction, hence the reverse sun gear 55 will also rotate in the reverse direction. The reverse sun gear 55 rotates the reverse planet pinions 52 in the forward direction, driving the reverse annular gear 54 in the forward direction. The reverse planet carrier 57 is prevented from rotating backwards, since it is mounted through 89 on the overrunning brake $O.W.B._1$ which becomes stationary during "breakaway." The reverse annulus gear 54 being splined to the output shaft 81 at 87, rotates the shaft in the forward direction. Because of the differential of both planetary gear sets 50, 60, the input shaft to output shaft ratio is 2.45 to 1, hence the torque output through the transmission is multiplied 2.45 times.

UPSHIFT TO SECOND

At a vehicle speed of 10 to 40 m.p.h. the governor G provides a pressure in conduit 140a which acts against the 1-2 shift valve 140 in chamber 148 and overcomes the spring load and throttle pressure applied on the right end of the valve. The valve 140 is thus moved from its FIG. 6 position to its FIG. 7 position. In this position the 1-2 shift valve 140 directs line pressure from conduit 119 through line 140e, including restriction D, to the apply chamber 58a of the kickdown servo 58, thus forcing the latter to its FIG. 7 position. The pressure in line 140e is also connected by line 140j to the chamber 358e of accumulator 358 and the line pressure in line 119c is connected to the chamber 358b of the accumulator. A regulated pressure is applied to the central area 358d of the accumulator through the metering effect of the 1-2 control valve 100 and line 125k. The forces exerted by the pressure in chamber 358b and the pressure in area 358d are overcome by the spring 358c and the pressure in chamber 358e. The action of the accumulator at this time cushions the engagement of the second speed band $B_2$.

At wide open throttle, the 1-2 control valve opens the path between lines 125d and 125k sufficiently to increase the pressure of fluid in chamber 358d because of increased pressure in chamber 100j controlled by orifice $J_2$ and $J_3$, thus facilitating shifting and improving shift capacity by providing the three stage capacity shifting described previously. When the kickdown band $B_2$ develops sufficient capacity to stop and hold the drums 43, 92 and the attached sun gears 61 and 55, the overrunning clutch $O.W.B._1$ starts to overrun so the release of the reverse planet carrier 57 is automatic.

DRIVE (D) SECOND OPERATION

The power flow is from the converter turbine 13 through the input shaft 23 and clutch $C_1$. The clutch $C_1$ being engaged, transmits power to annulus 64 and the latter causes the planet pinions 62 to rotate in the same direction.

Since the kickdown band $B_2$ is applied, the sun gear 61 cannot rotate and the planet pinions 62 will walk around the sun gear 61 forcing the planet carrier 63 in the same direction. The planet carrier is splined as indicated at 82 to the output shaft 81 and rotates the latter in the same direction at a ratio of 1.45 to 1.

UPSHIFT TO DIRECT

At a speed of approximately 15 to 75 m.p.h., depending on the throttle valve opening, the "governor" pressure acting on the left end of the 2-3 shift valve 240 shifts the latter from its FIG. 7 position to its FIG. 8 position. In this position the 2-3 shift valve 240 connects and directs a line pressure from line 140f into conduit 240aa. The line pressure is transmitted through conduit 240b, bypass 240c in shuttle valve 130 (around orifice E), and conduit 240d to the kickdown servo release ares 58b and by a conduit 240e to the clutch $C_2$.

During normal power upshifts, at greater throttle openings, the shuttle valve 130 is located in its FIG. 8 position so that line pressure is applied to clutch $C_2$ around the E orifice so that the engagement of clutch $C_2$ is rapid and the transmission is in direct drive as soon as kickdown servo 58 is released. During a "lift foot" upshift, the throttle pressure in line 125g drops and the shuttle plug 130f moves to the left as viewed in FIG. 9. The shuttle valve 130 also moves to the left under the influence of clutch pressure in line 240d and possibly 240c, and of governor pressure in line 140c, thereby connecting conduit 140e with line 240d through shuttle valve 130 and line 140i, and equalizing the pressure on both sides of the main servo piston until the piston return spring 58d releases the brake band. The pressure in the lines 240d and 240e builds up to release the servo and to apply the clutch $C_2$, so that there is a delay between the release of the band $B_2$ and the engagement of the clutch $C_2$. The $A_2$ orifice and waved spring 70 cushion the application of the clutch $C_2$.

DRIVE (D) DIRECT OPERATION

In direct drive both clutches $C_1$ and $C_2$ are engaged and locked together since elements 35 and 30 are splined together. Since annulus 64 is connected to clutch $C_1$ and sun gear 61 is connected to clutch $C_2$, the kickdown planetary unit 60 is in effect locked up. The power flow is from the converter turbine 13 through the input shaft 23 and both clutches $C_1$ and $C_2$; drums 43, 92, annulus 64, planetary set 60 to carrier 63 which is splined to output shaft 81. The output shaft 81 is rotated in the same direction as input shaft 23 and at a ratio of 1 to 1. Hence, there is no increase in torque or speed. The only torque multiplication in direct drive is that of the torque converter A.

KICKDOWN

When kickdown is desired, the accelerator pedal (not shown) is depressed so that the kickdown valve 230 is moved to the left as viewed in the drawings. The kickdown valve stem contacts the stem of the throttle valve 120 and mechanically pushes it to the left, to a point where the throttle valve uncovers the line pressure port from conduit 119b. The throttle valve 120 now connects the line pressure conduit 119b directly to the throttle pressure conduit 125. Hence, throttle pressure now increases and becomes the same value as line pressure. At this time the kickdown valve 230 has connected the throttle pressure conduit 125 to the conduit 230f. This pressure is transmitted through ball check valve BCI and a line 230h to the right end of 1-2 control where it is blocked by the control valve (FIG. 8) until the servo release pressure in line 400 allows the 1-2 control valve 100 to move to the left to its FIG. 10 position under the influence of spring 93. The pressure in chamber 358b will increase due to increased line pressure and the pressure in chamber 358c will decrease due to movement of servo 58, i.e., application of servo, thereby permitting accumulator 358 to stroke and pump fluid to servo apply chamber 58a. The movement of the accumulator piston supplies the fluid required by the servo, thereby reducing the time period needed for application. Afterwards it cushions the application of the band $B_2$ for the kickdown shift.

At vehicle speeds below 25 m.p.h. the kickdown occurs "direct to breakaway." The force of kickdown pressure on shift valve 140 is such that the valve overcomes the governor pressure applied to the plug thereof in chamber 148 and the valve moves from the FIG. 8 position to the FIG. 6 position. The 2-3 shift valve 240 has cut off line pressure to line 240b and hence clutch $C_2$ is released, as clutch $C_2$ is released, the overrunning brake $O.W.B._1$ picks up the reaction load and locks the planet carrier 57 against reverse rotation. The power flow in direct to breakaway kickdown (3-1) is the same as in breakaway operation.

It will be seen that the 1-2 shift control valve 100 improves 1-2 shift through a three stage capacity curve with all 1-2 shifts terminating in a flat balance plateau.

It will be seen that the servo 58 of this invention helps prevent both a runaway shift and an overlap shift by providing a cushion interval between band ($B_2$) application and clutch $C_2$ release, i.e., the brake band $B_2$ is first applied at a lower pressure for a time and then builds up to full braking pressure preferably after the speed change while clutch $C_2$ is being deenergized.

In view of the foregoing it will be seen that the several objects and advantages of this invention are achieved.

Although only one embodiment of the invention has been disclosed and described, it is apparent that other embodiments and modifications of the invention are possible.

We claim:

1. In an engine driven vehicle having a throttle valve control, a multispeed power transmission unit comprising input and output shafts, gearing interconnecting said shafts and arranged for selective activation to provide for transmission of a first, a second and third speed drive between said shafts, and automatically operable vehicle speed and throttle valve responsive pressure fluid activatable control means for said gearing arranged to automatically provide for sequential upshifts from first to second to third speed drive and reversely arranged downshifts, said automatically operable transmission shift control means including a clutch adapted to be engaged when the transmission is in a third speed drive condition and disengaged when said transmission is in a second speed condition, first and second members adapted to be coupled together when said clutch is engaged, a brake band for braking said first member, means for applying said brake band to said first member, said brake band being applied to said first member when said transmission is in a second speed condition and being in a nonapplied condition relative to said first member when said transmission is in a third speed condition, said means for applying said brake band including controlled load means for overlapping the disengagement of said clutch with the application of said brake band during a transition from a third speed condition to a second speed condition, said controlled load means including a cylinder, a primary piston movable in said cylinder, said piston having a bore therein, a secondary piston sealingly located in and movable in said bore, means for admitting fluid to said cylinder between one end portion thereof and one end portion of said primary piston, passage means in said primary piston for admitting fluid from said cylinder between said one end portion thereof and said one end portion of said primary piston to said bore between the end thereof and said secondary piston to provide a fluid pressure on both said primary piston and the secondary piston, and an actuating means extending between said secondary piston and said brake band for applying said brake band upon movement of said secondary piston and said primary piston toward said actuating means.

2. In an engine driven vehicle as set forth in claim 1 wherein said means for applying said brake band to said first member includes means for supplying fluid under pressure to said cylinder between said one end portion thereof and said one end portion of said primary piston, said fluid under pressure exerting pressure directly on said primary piston and on said secondary piston, a rapidly increasing force being applied on said band for a period of time as said pistons move together and then a relatively constant force being applied on said band as the pistons move relative to one another.

3. In an engine driven vehicle having a throttle valve control, a multispeed power transmission unit comprising input and output shafts, gearing interconnecting said shafts and arranged for selective activation to provide for transmission of a first, a second and a third speed drive between said shafts, and automatically operable vehicle speed and throttle valve responsive pressure fluid activatable control means for said gearing arranged to automatically provide for sequential upshifts from first to second to third speed drive and reversely arranged downshifts, said automatically operable transmission shift control means including a clutch adapted to be engaged when the transmission is in a third speed drive condition and disengaged when said transmission is in a second speed condition, first and second members adapted to be coupled together when said clutch is engaged, a brake band for braking said first member, means for applying said brake band to said first member, said brake band being applied to said first member when said transmission is in a second speed condition and being in a nonapplied condition relative to said first member when said transmission is in a third speed condition, said means for applying said brake band including controlled load means for sequentially applying said band to said first member during a shift from said third speed condition to said second speed condition, said controlled load means including a cylinder, a primary piston movable in said cylinder, said primary piston having a bore therein, and a secondary piston in said primary piston in sealing and sliding engagement therewith, means for supplying hydraulic fluid under pressure to said cylinder between one end portion thereof and one end portion of said primary piston for applying a force thereon, said primary piston having a passage through a wall thereof placing said cylinder between said one end portion thereof and said one end portion of said primary piston in communication with said bore between the end thereof and said secondary piston, said hydraulic fluid under pressure being applied to both said end portion of primary piston and through said passage to said bore between the end thereof and said secondary piston during an initial portion of said shift from a third speed condition to a second speed condition, said hydraulic fluid under pressure being forced from said bore between the end thereof and said secondary piston back through said passage to said cylinder between said one end portion thereof and said one end portion of said primary piston during a subsequent portion of said shift from a third speed condition to a second speed condition.

4. In an engine driven vehicle having a throttle valve control, a multispeed power transmission unit comprising input and output shafts, gearing interconnecting said shafts and arranged for selective activation to provide for transmission of a first, a second and a third speed drive between said shafts, and automatically operable vehicle speed and throttle valve responsive pressure fluid activatable shift control means for said gearing arranged to automatically provide for sequential upshifts from first to second to third speed drive and reversely arranged downshifts, said automatically operable transmission shift control means including a clutch adapted to be engaged when the transmission is in a third speed drive condition and disengaged when said transmission is in a second speed condition, first and second members adapted to be coupled together when said clutch is engaged, a brake band for braking said first member, means for applying said brake band to said first member, said brake band being applied to said first member when said transmission is in a second speed condition and being in a nonapplied condition relative to said first member when said transmission is in a third speed condition, said means for applying said brake band including controlled load means for applying a controlled load to said brake band and for preventing said clutch from assuming a completely disengaged condition for a short period after said brake band is applied to said first member during a transition from a third speed condition to a second speed condition, said controlled load means including a kickdown servo, said servo including a housing, said housing having a cylinder therein, a primary piston movable in said cylinder, means for supplying fluid under pressure into said cylinder between one end portion thereof and one end portion of said primary piston to move said primary piston in a band actuating direction, said primary piston having a bore therein, a secondary piston slideable in said bore and in sealing engagement therewith, and actuating means adapted to be moved by said secondary piston, passage means in said primary piston placing said bore between the end thereof and said secondary piston in communication with the fluid in said cylinder between said one end portion thereof and said one end portion of said primary piston, said fluid under pressure being supplied to said cylinder between said end portion thereof and said one end portion of said primary piston and then through said passage means to said bore during an initial portion of the shift from a third speed condition to a second speed condition, said primary piston, secondary piston and actuating means being adapted to move together to initially apply said brake band, said primary piston next being movable relative to said secondary piston causing fluid in said bore to be forced therefrom through said passage means into said cylinder, and then said primary and secondary pistons and said actuating means acting as a unit to apply a force to said brake band.

5. In an engine driven vehicle having a throttle valve control, a multispeed power transmission unit comprising input and output shafts, gearing interconnecting said shafts and arranged for selective activation to provide for transmission of a first, a second and a third speed drive between said shafts, and automatically operable vehicle speed and throttle valve responsive pressure fluid activatable control means for said gearing arranged to automatically provide for sequential upshifts from first to second to third speed drive and reversely arranged downshifts, said automatically operable transmission shift control means including a clutch adapted to be engaged when the transmission is in a third speed drive condition and disengaged when said transmission is in a second speed condition, first and second members adapted to be coupled together when said clutch is engaged, a brake band for braking said first member, means for applying said brake band to said first member, said brake band being applied to said first member when said transmission is in a second speed condition and being in a nonapplied condition relative to said first member when said transmission is in a third speed condition, said means for applying said brake band including means for overlapping the disengagement of said clutch and the application of said brake band during a transition from a third speed condition to a second speed condition, said means for overlapping the disengagement of said clutch and the application of said brake band including a servo unit, said servo unit comprising a housing having a cylinder therein, a primary piston in said cylinder, means providing for the ingress and egress of fluid into said cylinder on opposite ends of said primary piston, said primary piston having a bore therein, a secondary piston mounted for limited movement in said bore and being in sliding and sealing engagement therewith, passage means providing for the ingress and egress of fluid from said cylinder between an end portion thereof and one end of said primary piston to said bore, means extending from said secondary piston toward said brake band, and means in said bore biasing said secondary piston toward a first position in said bore, the fluid entering said bore from said one end of said primary piston opposing the force of said means biasing said secondary piston and means for supplying fluid under pressure to said cylinder between said one end portion thereof and said one end of said primary piston during an initial portion of a shift from a third speed condition to a second speed condition, said fluid under pressure passing from said cylinder through said passage means to said bore to bias said pistons apart during said initial portion of the shift, said fluid being forced from said bore through said passage means during a subsequent portion of the shift.

6. A variable speed transmission for an automotive vehicle comprising a housing, axially aligned, input and output shafts journaled in sleevelike, axially extending, inwardly disposed, bearing portions at opposite ends of said housing, a pair of clutch devices mounted on and extending concentrically about one of said shafts, a pair of planetary gear train devices spaced axially from one another along the axis of said shafts, said shafts being self-contained units wherein the axially directed thrust forces applied to one shaft are isolated from the other shaft, each of said gear trains comprising a sun gear, an annulus gear and a pinion gear carrier having pinion gearing rotatably mounted thereon and meshingly engaged with the associated sun and annulus gears, drive transmitting means connecting one of said clutch devices to one gear of each of said gear trains, drive transmitting means connecting the other of said clutch devices to another gear of one gear train, means drivingly connecting the remaining gear of said one gear train to said other shaft, means preventing the transmission of gearing thrust forces from said other shaft to said one shaft, means drivingly connecting another one of the gears of the other gear train to said other shaft, means preventing the transmission of gearing thrust forces to said housing, friction means to activate said gear trains for the transmission of a plurality of different speed ratio drives between said shafts, actuating means for said friction means including a cylinder, a primary piston movable in said cylinder, said piston having a bore therein, means for providing for the ingress and egress of fluid into and out of said cylinder on opposite ends of said primary piston, a secondary piston movable in said bore and having a sealing engagement therewith, spring means biasing said secondary piston toward one position in said bore, and an actuating mechanism extending between said secondary piston and said friction means for applying said friction means upon movement of said secondary piston, passage means in said primary piston providing for the ingress and egress of fluid from said cylinder between the end thereof and one end portion of said primary piston to said bore between the end thereof and said secondary piston for applying a force to said secondary piston opposing said spring means, the fluid in said bore between the end thereof and said secondary pistons being forced therefrom through said passage means into said cylinder upon movement of said primary piston toward said friction means beyond a predetermined point.

7. In an engine driven vehicle having a throttle valve control, a multispeed power transmission unit comprising input and output shafts, gearing interconnecting said shafts and arranged for selective activation to provide for transmission of a first, a second and a third speed drive between said shafts, and automatically operable vehicle speed and throttle valve responsive pressure fluid activatable control means for said gearing arranged to automatically provide for sequential upshifts from first to second to third speed drive and reversely arranged downshifts, said automatically operable transmission shift control means including a clutch adapted to be engaged when the transmission is in a third speed drive condition and disengaged when said transmission is in a second speed condition, first and second members adapted to be coupled together when said clutch is engaged, a brake band for braking said first member, means for applying said brake band to said first member, said brake band being applied to said first member when said transmission is in a second speed condition and being in a nonapplied condition relative to said first member when said transmission is in a third speed condition, said means for applying said brake band including controlled load means for applying a controlled load to said brake band and for preventing said clutch from assuming a completely disengaged condition for a short period after said brake band is applied to said first member during a transition from a third speed condition to a second speed condition, said controlled load means including a kickdown servo, said servo including a cylinder, two pistons, one piston being movable in said cylinder, the other piston being movable inside and relative to said one piston, means for applying fluid under pressure to said cylinder between one end portion thereof and said one piston, said one piston having a passage therein to permit said fluid under pressure to flow into said one piston behind said other piston for biasing said pistons away from one another.

* * * * *